United States Patent
Wu

(10) Patent No.: US 9,509,836 B2
(45) Date of Patent: Nov. 29, 2016

(54) COMMUNICATION DEVICE AND METHOD CAPABLE OF AUTOMATIC RESPONSE TO INCOMING CALL

(71) Applicant: Chiun Mai Communication Systems, Inc., New Taipei (TW)

(72) Inventor: Cheng-Han Wu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 116 days.

(21) Appl. No.: 14/612,440

(22) Filed: Feb. 3, 2015

(65) Prior Publication Data

US 2015/0229759 A1 Aug. 13, 2015

(30) Foreign Application Priority Data

Feb. 11, 2014 (CN) .......................... 2014 1 0047868

(51) Int. Cl.
*H04M 3/42* (2006.01)
*H04W 4/12* (2009.01)
*H04W 64/00* (2009.01)

(52) U.S. Cl.
CPC ..... *H04M 3/42042* (2013.01); *H04M 3/42365* (2013.01); *H04W 4/12* (2013.01); *H04W 64/006* (2013.01)

(58) Field of Classification Search
CPC .................... H04M 3/42042; H04M 3/42365; H04W 4/12; H04W 64/006
See application file for complete search history.

(56) References Cited

U.S. PATENT DOCUMENTS

| 8,810,392 B1* | 8/2014 | Teller ..................... G08B 21/24 235/385 |
| 2002/0177928 A1* | 11/2002 | Moriguchi .......... H04M 1/6091 701/1 |
| 2009/0252371 A1* | 10/2009 | Rao ...................... H04N 1/6052 382/100 |
| 2014/0141823 A1* | 5/2014 | Kozakaya ............. G06T 7/0002 455/500 |
| 2014/0364158 A1* | 12/2014 | Hwang ................. H04W 4/185 455/466 |

* cited by examiner

*Primary Examiner* — Lewis West
(74) *Attorney, Agent, or Firm* — Zhigang Ma

(57) ABSTRACT

A method for a communication device to automatic respond to an incoming call is provided. The method includes: configuring a destination and a message template; detecting whether there is an obstruction in front of the communication device and a picture taken by a rear camera is in an even color when an incoming call is received; turning off a ringtone of the incoming call if there is an obstruction and the picture is in an even color; detecting a current position and position variation by a GPS unit; calculating an average speed based on the position variation; and hanging up the incoming call, calculating a time required to reach the destination, filling out the message template with the time required to form a predefined message, and then transmitting the predefined message to the caller of the incoming call if the average speed equals to or exceed a predefined value.

16 Claims, 3 Drawing Sheets

COMMUNICATION DEVICE AND METHOD CAPABLE OF AUTOMATIC RESPONSE TO INCOMING CALL

FIELD

The subject matter herein generally relates to a phone and a method capable of automatic response to incoming calls.

BACKGROUND

Communication devices, for example, smart phones, or other electronic devices with a function of a phone, have been used with increasing popularity worldwide. When a call is coming, a user in a convenient condition can answer the phone in time. However, sometimes a user is in an inconvenient condition to answer an incoming call, for example, when the user is driving a motor vehicle or a bicycle. In that inconvenient condition, the called party cannot answer in time while the caller cannot obtain current status of the called party and may feel upset. Therefore, there is a need for a phone capable of automatic response to incoming calls.

BRIEF DESCRIPTION OF THE DRAWINGS

Implementations of the present technology will now be described, by way of example only, with reference to the attached figures.

DETAILED DESCRIPTION

Figure 1:
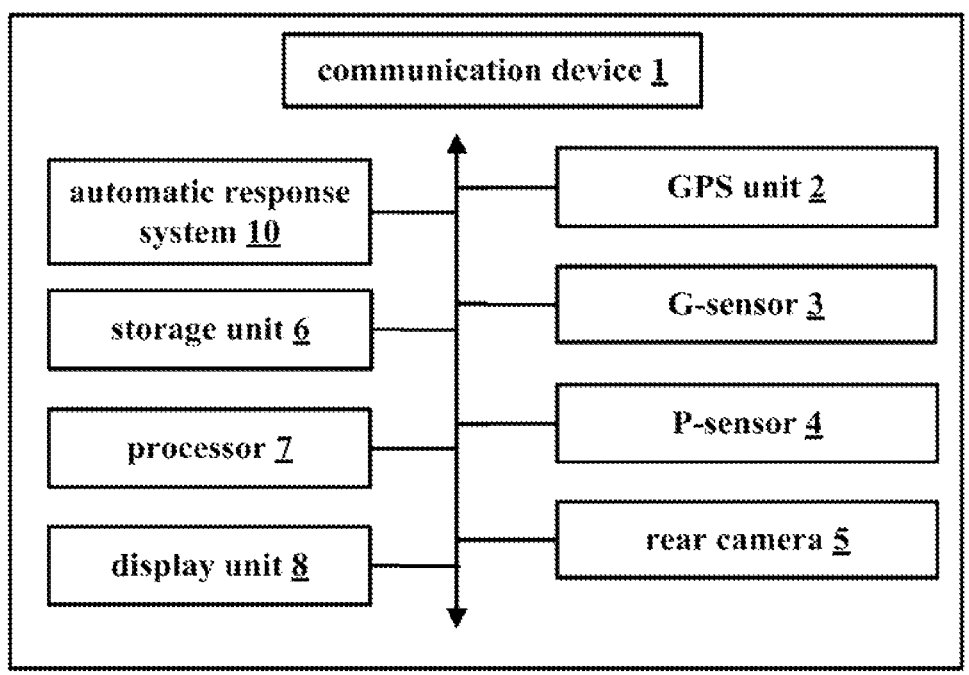
FIG. 1 is a diagrammatic view of an exemplary embodiment of a communication device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

FIG. 1 illustrates a diagrammatic view of an exemplary embodiment of a communication device 1. In the example embodiment, the communication device 1 can be a smart phone, or an electronic device with a function of a phone. The communication device 1 can include, but not limited to, a global position system (GPS) unit 2, a gravity sensor (G-sensor) 3, a proximity sensor (P-sensor) 4, a rear camera 5, storage unit 6, a processor 7, and a display unit 8. The GPS unit 2 can be arranged inside the communication device 1, and configured to obtain a current position of the communication device 1 and position variation of the communication device 1. The communication device 1 can be configured to calculate an average speed of the communication device 1 based on the position variation of the communication device 1. The communication device 1 can be configured to calculate an average speed of the communication device 1 based on acceleration variation of the communication device 1, when the GPS unit 2 cannot work well due to undesired environments, for example, high buildings surrounded. The G-sensor 3 can detect current acceleration and the acceleration variation of the communication device 1.

The P-sensor 4 can be an optical displacement sensor, a linear proximity sensor, or an ultrasonic displacement sensor. The P-sensor 4 can be configured to detect whether there is an obstruction in front of the communication device 1. The P-sensor 4 can include an emitter and a receiver. For example, the emitter can be an infrared emitter, and can emit an infrared light. If there is an obstruction in front of the communication device 1, the infrared light can be reflected back by the obstruction and then can be received by the receiver. The P-sensor can determine whether there is an obstruction in front of the communication device 1 based on the reflected light received by the receiver.

The rear camera 5 can be configured to take a picture of the environment in back of the communication device 1. If there is an obstruction in front of the communication device 1, and the picture taken by the rear camera 5 is in an even color, for example, even black or even white, the communication device 1 can be determined to be in a bag or a pocket.

The storage unit 6 can be an internal storage unit of the communication device 1, for example, a hard disk or memory, or a pluggable memory, for example, Smart Media Card, Secure Digital Card, Flash Card. In at least one embodiment, the storage unit 6 can include two or more storage devices such that one storage device is an internal storage unit and the other storage device is a pluggable memory. The storage unit 6 can be configured to store at least one message template, for example, "sorry, I'm not convenient to answer your call now, please contact me XX minutes later, thank you".

The processor 7 can be a central processing unit (CPU), a microprocessor, or other data processor chip that performs functions of the communication device 1. The display unit 8 can be configured to display information of the incoming call, for example, a name of the caller, a number of the incoming call, and call time of the incoming call.

Figure 2:
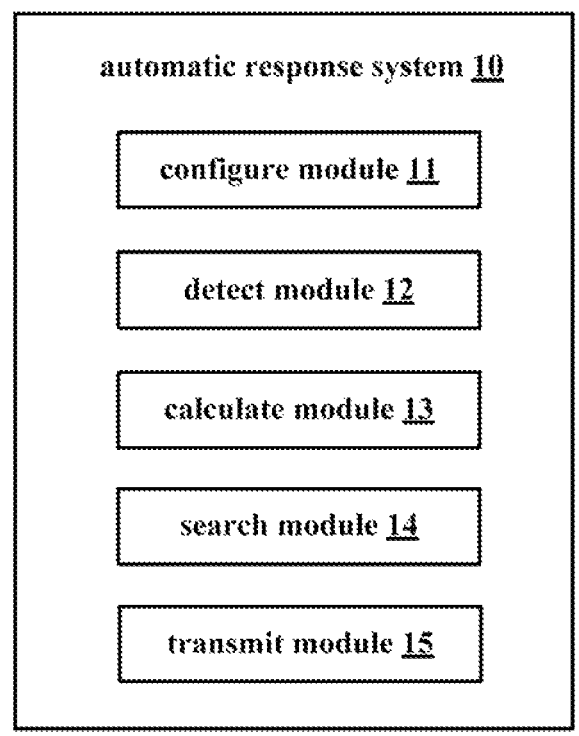
FIG. 2 is a block diagram of an exemplary embodiment of an automatic response system.

An automatic response system 10 can include computerized instructions in the form of one or more programs that are executed by the processor 7 and stored in the storage unit 6. Referring to FIG. 2, the system 10 can include one or more modules, for example, a configure module 11, a detect module 12, a calculate module 13, a search module 14, and a transmit module 15. A "module," as used herein, refers to logic embodied in hardware or firmware, or to a collection of software instructions, written in a programming language, such as, JAVA, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The configure module 11 can be configured to configure a message template, a destination and a delay time to start to calculate an average speed of a communication device. The delay time is a time interval from the earliest time that the incoming call is received to the time that the communication device starts to calculate an average speed of the communication device. Generally, if incoming call duration is a very short time, the call can be likely an improper call. In at least one embodiment, the delay time can be configured to be call duration of an improper call. The delay time can be 20 seconds, 30 seconds, 1 minute, or any other suitable time length for excluding improper calls. The detect module 12 can be configured to detect a current position of the communication device and position variation of the communication device by a GPS unit. The calculate module 13 can be configured to calculate an average speed of the communication device based on the position variation of the communication device. When the communication device is located in an environment, for example, on a road surrounded by high buildings, the GPS unit cannot work efficiently, the calculate module 13 can be configured to calculate an average speed of the communication device based on acceleration detected by a G-sensor of the communication device. The calculate module 13 further can be configured to calculate time required to reach the destination based on the average speed and a distance between the current position and the destination. The search module 14 can be configured to search in a remote database to obtain the distance between the current position and the destination. In at least one embodiment, the distance between the current position and the destination can be detected by the GPS unit. The transmit module 15 can be configured to fill out the message template with the time required to form a predefined message, and then to transmit the predefined message to the caller.

Figure 3:
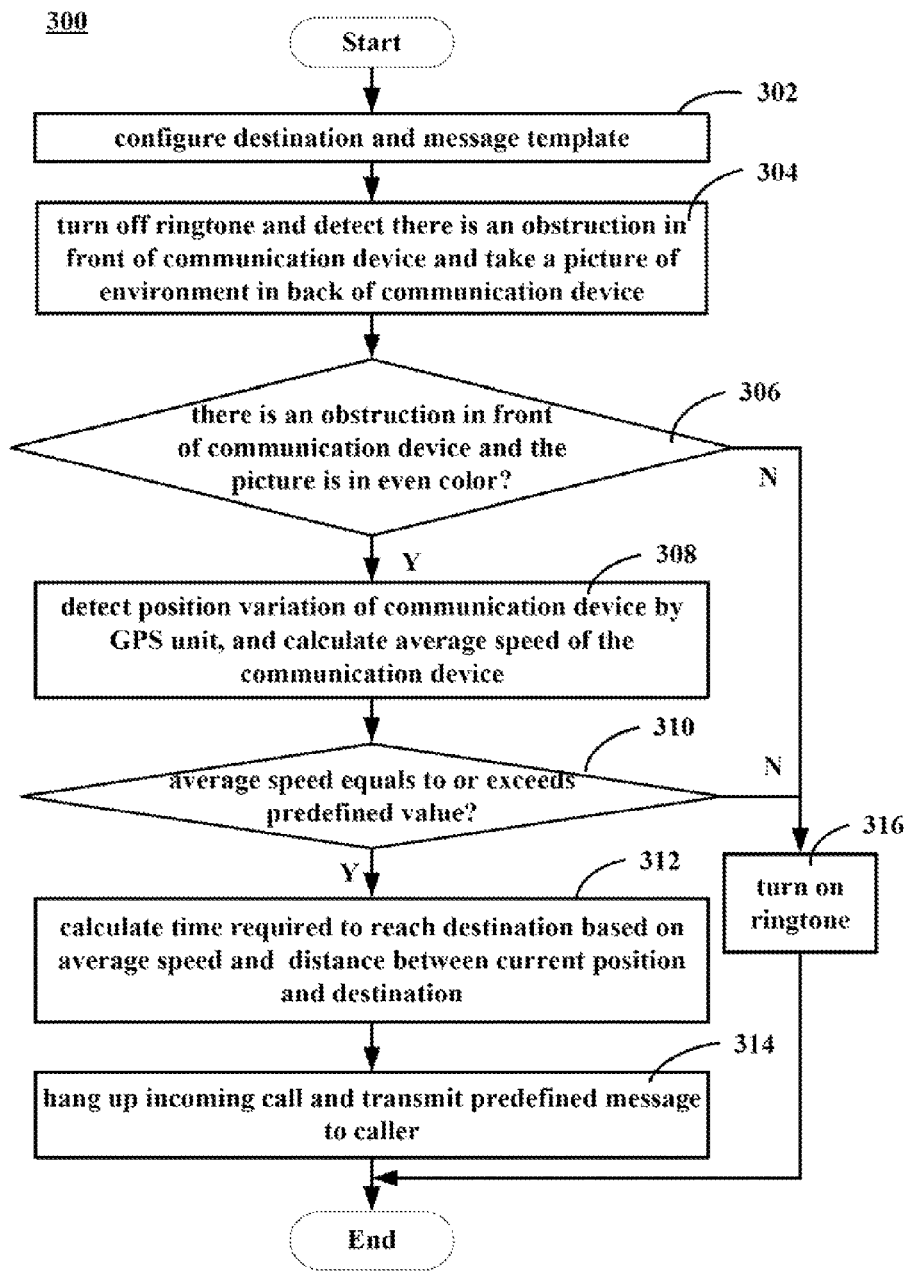
FIG. 3 is a flowchart of an exemplary embodiment of a method for automatic response to an incoming call.

Referring to FIG. 3, a flowchart is presented in accordance with an example embodiment which is being thus illustrated. The example method 300 is provided by way of example, as there are a variety of ways to carry out the method. The method 300 described below can be carried out using the configurations illustrated in FIGS. 1 and 2, for example, and various elements of these figures are referenced in explaining example method 300. Each block shown in FIG. 3 represents one or more processes, methods or subroutines, carried out in the exemplary method 300. Furthermore, the illustrated order of blocks is by example only and the order of the blocks can change according to the present disclosure. Additional blocks may be added or fewer blocks may be utilized, without departing from this disclosure. The exemplary method 300 for automatic response to an incoming call is illustrated in FIG. 3. The exemplary method 300 can be executed by a communication device, and begin at block 302.

At block 302, the communication device configures a destination, a message template. In at least one embodiment, the communication device configures a delay time to start to calculate an average speed of a communication device. The delay time is a time interval from the earliest time that the incoming call is received to the time that the communication device starts to calculate an average speed of the communication device. Generally, if incoming call duration is a very short time, the call can be likely an improper call. In at least one embodiment, the delay time can be configured to be call duration of an improper call. The delay time can be 20 seconds, 30 seconds, 1 minute, or any other suitable time length for excluding improper calls. The destination can be a place where the driver stops driving. The message template can be a message with some blank field. For example, the predefined message can be "sorry, I'm driving and cannot answer your call, I will call back to you XX minutes later", or "sorry, I'm inconvenient to answer your call now, please contact me XX minutes later". XX minutes means a time required to reach the destination. When the blank field of the message template is filled, a predefined message is therefore formed and can be transmitted to the caller to tell the caller a current station of the driver.

At block 304, the communication device detects whether there is an incoming call. when an incoming call is received, the communication device can turn off ringtone of the incoming call, and cause a proximity sensor of the communication device to determine whether there is an obstruction in front of the communication device, and cause a rear camera of the communication device to take at least one picture of the environment in back of the communication device.

At block 306, the communication device determines whether there is an obstruction in front of communication device and the picture is in an even color. If there is an obstruction in front of the communication device, and the picture taken by the rear camera is in an even color, for example, even black or even white, the communication device can determines that the communication device is in a pocket or a bag, the process goes to block 308, otherwise, the process goes to block 312.

At block 308, the communication device turns off a ringtone of the incoming call and then detects a current position and position variation of communication device by a GPS unit of the communication device, and then calculates an average speed of the communication device. If the GPS unit cannot work efficiently due to surroundings, for example, high buildings surrounding, the communication device can calculate the average speed based on acceleration detected by a G-sensor of the communication device.

At block 310, the communication device determines whether the average speed equals to or exceeds a predefined value, for example, the predefined value can be greater than a maximum running speed. In at least one embodiment, the predefined value can be greater than a walking speed. The walking speed can be about 5.4 km/h, and the maximum running speed can be about 10 km/h. If the average speed equals to or exceeds the predefined value, the process goes to block 314, otherwise, the process goes to block 316.

At block 312, the communication device calculates time required from a current position to the destination based on the average speed and a distance between the current position and the destination. The current position and the distance between the current position and the destination can be detected by the GPS unit. At least one embodiment, the distance between the current position and the destination can be obtained by searching in a remote server based on the destination and the current position of the communication device. The remote server can store at least one map.

At block 314, the communication device hangs up the incoming call, fills out the message template with the time required to form a predefined message, and then transmits the predefined message to the caller of the incoming call.

At block 316, the communication device turns on the ringtone of the incoming call and then the process goes to an end.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for an automatic response to an incoming call, comprising:
   configuring, at a communication device, a destination and a message template with at least one blank field;
   capturing, at the communication device, a picture by a rear camera;
   detecting, at the communication device, whether there the picture is in an even color when an incoming call is received;
   detecting, at the communication device, whether there is an obstruction in front of the communication device;
   disabling, at the communication device, a ringtone of the incoming call if there is an obstruction in front of the communication device and the picture is in an even color;
   detecting, by a GPS unit of the communication device, a current position and position variation;
   calculating, at the communication device, an average speed based on the position variation;
   determining, at the communication device, whether the average speed is equal to or exceeds a predefined value; and
   hanging up, at the communication device, the incoming call, if the average speed equals to or exceeds a predefined value;
   calculating, at the communication device, a time required to reach the destination based on the average speed and a distance between the current position and the destination; and
   filling out, at the communication device, the message template with the time required to form a predefined message, and then transmitting the predefined message to the caller of the incoming call.

2. The method according to claim 1, wherein the distance between the current position and the destination is detected by the GPS unit.

3. The method according to claim 1, wherein the distance between the current position and the destination is obtained by searching a remote database which stores a map based on the current position and the destination.

4. The method according to claim 1, wherein the average speed can be calculated based on acceleration of the communication device detected by a gravity sensor of the communication device.

5. The method according to claim 1, wherein calculating the average speed occurs after a delay time from the earliest time when an incoming call is received, wherein the delay time is a time interval for excluding improper calls.

6. The method according to claim 1, further comprising: turning on, at the communication device, a ringtone of the incoming call if there is not an obstruction in front of the communication device or the picture is not in an even color.

7. The method according to claim 1, further comprising: turning on, at the communication device, a ringtone of the incoming call if the average speed is less than the predefined value.

8. The method according to claim 1, wherein the predefined value is greater than a maximum running speed.

9. A communication device, comprising:
   a GPS unit for detecting a current position and position variation of the communication device;
   a proximity sensor for detecting whether there is an obstruction in front of the communication device;
   a rear camera for taking at least one picture of an environment in back of the communication device;
   a storage unit for storing instructions;
   a processor for executing the instructions to cause the processor to:
   configure a destination and a message template with at least one field blank;
   capture a picture by the rear camera;
   detect whether there the picture is in an even color when an incoming call is received;
   detect whether there is an obstruction in front of the communication device by the proximity sensor;
   disable a ringtone of the incoming call if there is an obstruction in front of the communication device and the picture is in an even color;
   detect, by the GPS unit of the communication device, a current position and position variation;
   calculate an average speed based on the position variation;
   determine whether the average speed is equal to or exceeds a predefined value; and
   hang up the incoming call if the average speed equals to or exceeds a predefined value, and then calculate a time required to reach the destination based on the average speed and a distance between the current position and the destination, fill out the message template with the time required to form a predefined message, and then transmit the predefined message to the caller of the incoming call.

10. The device according to claim 9, wherein the distance between the current position and the destination is detected by the GPS unit.

11. The device according to claim 9, wherein the distance between the current position and the destination is obtained by searching a remote database which stores a map based on the current position and the destination.

12. The device according to claim 9, further comprising a gravity sensor for detecting current acceleration and acceleration variation of the communication device, wherein the average speed can be calculated based on acceleration variation.

13. The device according to claim 9, wherein the processor calculates the average speed after a delay time from the earliest time when an incoming call is received, wherein the delay time is a time interval for excluding improper calls.

14. The device according to claim 9, wherein the instructions further cause the processor to: turn on a ringtone of the incoming call if there is no an obstruction in front of the communication device or the picture is not in an even color.

15. The device according to claim 9, wherein the instructions further cause the processor to: turn on a ringtone of the incoming call if the average speed is less than the predefined value.

16. The device according to claim 9, wherein the predefined value is greater than a maximum running speed.

* * * * *